March 25, 1930.   L. D. BRUECKEL   1,752,229
COMPRESSION BRAKE
Filed Nov. 7, 1925
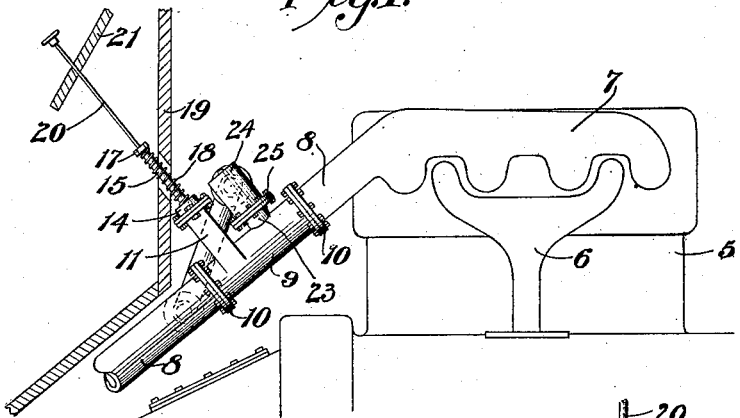
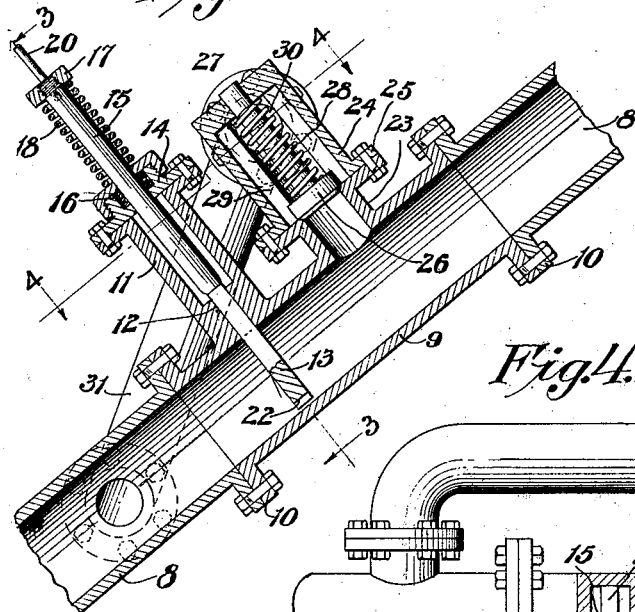
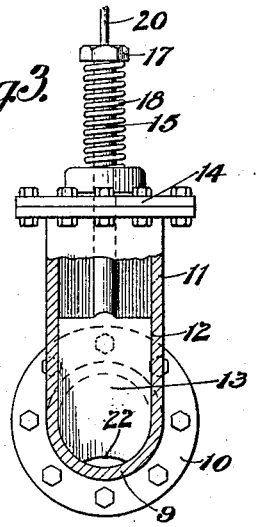
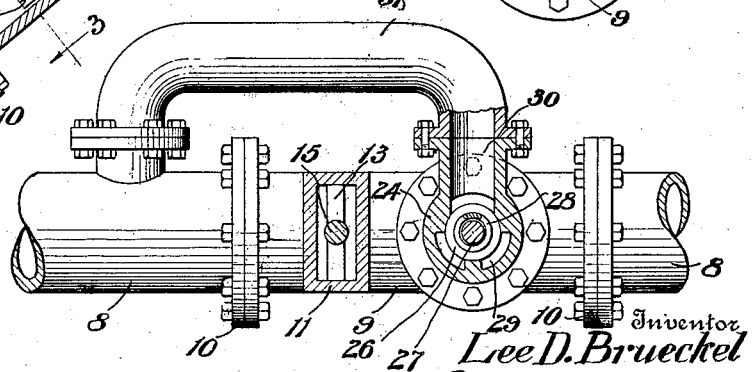
Witnesses
C. L. McDonald
E. N. Lovewell
Inventor
Lee D. Brueckel
By E. G. Siggers
Attorney Patented Mar. 25, 1930

1,752,229

UNITED STATES PATENT OFFICE

LEE D. BRUECKEL, OF STEUBENVILLE, OHIO

COMPRESSION BRAKE

Application filed November 7, 1925. Serial No. 67,692.

This invention relates to a device for retarding the action of internal combustion engines by opposing the expansion, or by causing the compression of the gases discharged from the cylinders, and it is especially suited for use on motor vehicles to retard their progress in descending steep grades.

The object of the invention is to provide a simple and practical device of this nature which may be substituted for a portion of the exhaust pipe, which may be operated at will to create a back pressure sufficient to retard the operation of the engine, but not sufficient to stop it altogether, while the structure and operation of the various parts connected with the engine are not otherwise altered.

In the drawing:

Figure 1 is a side elevation of one embodiment of the invention as applied to the exhaust pipe of an automobile engine.

Figure 2 is a vertical longitudinal section of the device shown in Fig. 1 and drawn on a larger scale.

Figure 3 is a section taken on the line 3—3 of Figure 2.

Figure 4 is a section taken on the line 4—4 of Figure 2.

The preferred embodiment of the invention is shown in connection with an automobile engine 5, having an inlet manifold 6 and an exhaust manifold 7 from which the exhaust gases are conducted through an exhaust pipe 8 to a suitable muffler. The attachment to which the present invention relates comprises a section of pipe 9, which is substituted for a portion of the exhaust pipe 8, and is secured to the latter by flange couplings 10, or other suitable means.

The pipe section 9 is formed with a perpendicular projection 11, constituting the valve box, having a slot 12 through its inner end, and arranged in a plane perpendicular to the pipe section 9. A cut-off valve 13 is adapted to reciprocate in the slot 12. The outer end of the valve box 11 has a head 14, which is removably secured in any suitable manner. The valve 13 is formed with a stem 15, which extends through the head 14, and is surrounded by a suitable packing gland 16.

A collar 17 is secured to the outer end of the stem 15, and a coiled spring 18, surrounding the stem beneath the collar 17, urges the valve 13 outwardly, and if left free to act will completely retract the valve from the passageway through the pipe section 9.

The valve stem 15 may be extended upwardly at an angle through the dash board 19, so as to be actuated by the foot of the driver to close, or partially close, the valve 13, or the stem may be provided with an extension 20 which extends upwardly through the instrument panel 21, so that the valve may be actuated by the hand. The inner end of the valve is provided with a concave recess 22, so that when the valve is moved inwardly as far as possible, there will still remain a sufficient opening to permit the escape of a sufficient portion of the gas evolved by the explosions in the engine cylinders, so that little of it, if any, will be forced backwardly into the inlet manifold when the inlet valves are opened.

The pipe section 9 is also provided between the valve 13 and the exhaust manifold 7 with a perpendicular branch 23 to which a safety valve box 24 may be secured by a flange union 25, or in any other suitable manner. A valve 26 is mounted for reciprocation within the box 24, and has a stem 27 extending through the outer end of the box. A coiled spring 28 surrounds the valve stem, and normally holds the valve 26 upon its seat with considerable pressure. The spring 28, however, is sufficiently yieldable, so that if the expansive force of the gas is great enough so that there is danger of rupturing the exhaust pipe, this pressure will be immediately relieved through the valve 26. The interior of the box 24 is formed with channels 29, whose cross sectional area is collectively equal approximately to the cross sectional area of the passageway through the branch 23. The excess pressure, therefore, as soon as the valve 26 opens, is relieved through the channels 29 and a mouth 30 with which they communicate.

An extension pipe 31 may be connected to the mouth 30, so as to conduct the gases emitted therefrom to a point where they may be safely discharged into the atmosphere, or the extension 31 may be in the nature of a by-pass extending around the valve 13, and connected to the pipe 8 in rear of the section 9, so that whatever gases are expelled through the safety valve will pass through the muffler.

From the foregoing description, it will be noted that the normal operation of the engine, including the intake and exhaust is not altered in any way, other than to retard the same by reason of the back pressure caused by closing the valve 13. The recess 22 is large enough, so that when the valve 13 is closed as far as possible, it will not stop the action of the engine altogether. The driver, when the automobile is going too fast, may partially close the valve 13 to slacken his speed, but if he closes the valve as far as possible, the pressure resulting from the explosion will still be sufficiently relieved through the opening 22 to permit a small amount of fuel to be taken in when the inlet valve to the engine cylinder is opened. If it were not for this opening 22, it may be readily seen that the pressure due to the explosion would necessarily be relieved through the carbureter as soon as the intake valve was opened, and might set fire to the gas in the carbureter.

The relief valve 26 is also an important feature, since without it the driver might, by closing the valve 13 too suddenly, cause a comparatively small portion of the exhaust pipe to receive the effect of the explosion of a full charge of fuel. This would result in bursting the exhaust pipe, unless it were made excessively heavy.

Normally the slide valve 13 is entirely withdrawn from the exhaust passageway, so that the latter is entirely unobstructed, and there is no chance for carbon to collect on the valve, or to be dammed up in the exhaust passageway.

While I have shown and described in detail the preferred construction of the invention, it is to be understood that various modifications may be made therein without any material departure from the salient features of the invention as expressed in the claim.

What is claimed is:

The combination with the exhaust pipe of an automobile engine, of a pipe section interposed therein, said section including a valve box extending perpendicularly from the section, a cut-off gate valve slidably mounted in said box and projectable completely across the exhaust pipe, and yieldable means normally holding the valve retracted, leaving the passage through the exhaust pipe entirely unobstructed, said valve having an escape opening for the exhaust gases when the valve is fully projected.

In testimony, that I claim the foregoing as my own, I have hereto affixed my signature.

LEE D. BRUECKEL.